United States Patent [19]

Boivie

[11] Patent Number: 4,525,860

[45] Date of Patent: Jun. 25, 1985

[54] CHARACTER RECOGNITION ARRANGEMENT

[75] Inventor: Richard H. Boivie, Middletown, N.J.

[73] Assignee: AT&T Bell Laboratories, Murray Hill, N.J.

[21] Appl. No.: 337,092

[22] Filed: Jan. 4, 1982

[51] Int. Cl.³ .............................................. G06K 9/80
[52] U.S. Cl. ........................................ 382/21; 382/30
[58] Field of Search ...................... 382/21, 55, 22, 30, 382/34

[56] References Cited

U.S. PATENT DOCUMENTS

| | | | |
|---|---|---|---|
| 3,609,685 | 9/1971 | Deutsch | 382/21 |
| 3,863,218 | 1/1975 | Oka et al. | 382/21 |
| 4,020,463 | 4/1977 | Himmel | 382/21 |
| 4,034,344 | 7/1977 | Saraga et al. | 382/55 |
| 4,040,009 | 8/1977 | Kadota et al. | 382/21 |
| 4,162,482 | 7/1979 | Su | 382/55 |
| 4,204,232 | 5/1980 | Mizuno | 382/55 |
| 4,310,827 | 1/1982 | Asai | 382/21 |

Primary Examiner—Leo H. Boudreau

Attorney, Agent, or Firm—David H. Tannenbaum

[57] ABSTRACT

There is disclosed an algorithm for electronically recognizing characters. The algorithm relies upon the establishment of a particular standard "name" for each character. A name is a sequence of "u"s, "d"s, "l"s, "r"s, and "-"s that describes the path that results when the character is traversed in a particular way. The name contains a "u" when the path goes up, a "d" when it goes down and "l"s and "r"s when it goes left and right respectively. "-"s are used to retrace the path so that a (second or third) branch can be attached to an earlier point in the path. The algorithm constructs a name for an unknown character, and then, using a unique directory lookup algorithm, determines which standard name is closest to the derived name. The algorithm contains a series of rules for traversing characters to minimize ambiguities while still allowing a great deal of latitude in the recognition process. Under the procedure disclosed, no prior knowledge is required pertaining to the actual font or design of the character to be recognized.

7 Claims, 16 Drawing Figures

FIG. 3
FIG. 4
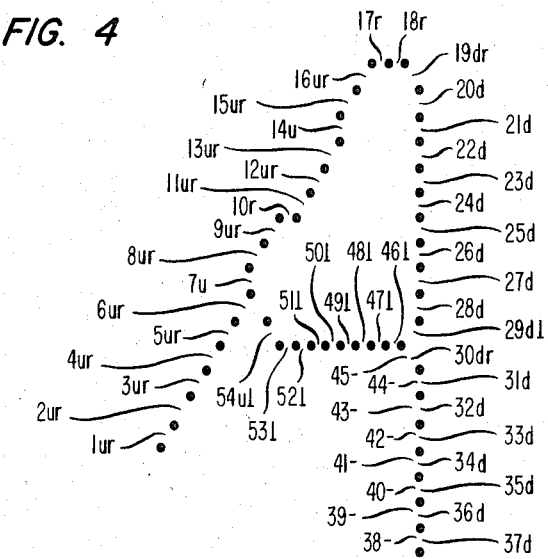
FIG. 5
| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|---|---|---|---|---|---|---|---|---|---|---|---|---|---|---|---|
| ur | ur | ur | ur | ur | ur | u | ur | ur | r | ur | ur | ur | u | ur | ur | r | r | dr | d | d | d | d | d | d | d | d | dl | dr | d | d | d | d | d |
| 35 | 36 | 37 | 38 | 39 | 40 | 41 | 42 | 43 | 44 | 45 | 46 | 47 | 48 | 49 | 50 | 51 | 52 | 53 | 54 |
|---|---|---|---|---|---|---|---|---|---|---|---|---|---|---|---|---|---|---|---|
| d | d | d | - | - | - | - | - | - | - | - | l | l | l | l | l | l | l | l | ul |

FIG. 6

| FIG. 7 |
| FIG. 8 |

FIG. 7

| STANDARD SPELLING | LETTER / NUMBER |
|---|---|
| uurfuurfuurfuurfuurfuurfuurfuurfuurfuurfuurfuurfuurfuurfurrurrurrurrurrurrurrurrurrdrdrdrdrdrdrdrdrdrdrdrdrdrdrdrdrd----------dldlllllllllllllllllllllllllllllllul | A |
| ulululuuuuunnnnnnnruluuwuuuwuurrrrrrrrrrrrrrrrrrdrdrdrdddddldldldldldldldldldrdrdrdrdrdrdrdldldldldldldldldlll--------------ulldldlllllulpldllllllllllllll | B |
| ululululululuuluuuuuwuuuurururururrurrurrurrurrurrurrrrrr----------------rrrrrrrrrrrrrrrrrrrrurr | C |
| ululuunnrrrnnrnnnnnnnnnnnnnn--------TlTlllTTlTlTpTTpTlpTlpTpTpTpTpTpTpTpTp | D |
| ululuuuuunnnnnnruluunnnrnnnnrrrrrrrrrrrrrrrr------------rrrrrrrrrrrrrrrr-------------------------------rrrrrrrrrrrrrrrrrr | E |
| nnnnnnnnnrurururuluuuunnnurrrrrrrrrrrrrrrrrrrrrr--------------rrrrrrrrrrrrrr | F |
| ulululululuuluuuuuuwururururururururururururrurrurrrrrrrrrrrrrrrrrrrrrrrdrdr------------------------rdrrrdrrrrrrrrrrrururrrrrrrrururururururuuu | G |
| uulullllllllllll------------nnnnnnnnnnnn--------ppppppppppppp | H |
| rrrrrrrrrrrrrrurururunununnnnrnnnnnn--------rrrrrrrrrrrrrrrrrrrrrrrrrrrr--------urrurrrrrrr------drdrrrrrrrrrrr | I |
| rdrdrrrdrrrrrrrrrdrrrurrrrrururururururururuluuTlTllTlllllllllTllllllll--------urrurrrrr | J |

CHARACTER RECOGNITION ARRANGEMENT

BACKGROUND OF THE INVENTION

This invention relates to an arrangement for determining the identity of a provided character. The problem of designing a machine that can reliably recognize a wide range of character types has long fascinated engineers and computer scientists.

Indeed, machine identification of characters has become an important area of concern with the advent of electronic text processing and video graphics. Such a machine would have a variety of uses in the "office of the future". It could allow computers to "read" a wide variety of documents, from business letters and purchase orders to memos and newspaper articles, even if those documents were not already in "machine readable" form. This would permit computers to read, store, search, process and archieve a wide range of information without requiring information to be "keyed in" if it were already available on paper.

A reliable character recognition device could also be used to lower the cost of transmitting (and storing) documents that are currently processed by facsimile machines. Instead of transmitting values (of "lightness" or "darkness") for a document's "picture elements", a machine could "read" a document and transmit ascii codes for its characters.

The problem has many aspects, one of which is the fact that characters can be written in many fonts or styles, each varying significantly from the next. Thus, one person may construct an "A" with both its feet on the ground while another person will write the "A" leaning on one side or the other. Some people will make fat "A"s while others will make skinny "A"s. Thus, a general purpose character recognition arrangement must be capable of handling all such variations.

Existing pattern recognition schemes can be grouped into two general categories: the decision theoretic (or discriminant) approach and the syntactic (or structural) approach.

In the decision theoretic approach, a set of characteristic measurements, or features, is "extracted" from a pattern. Each pattern is represented by a feature vector and the recognition of characters is accomplished by partitioning the feature space.

The syntactic approach involves the recognition of a pattern's primitive "subpatterns". Subpatterns are recognized by the decision theoretic approach or by exact matching, and a description of the various subpatterns and their relationships is constructed. The description is "reduced" using the productions of a grammar in much the same way as a program written in a high-level language is reduced by a complier. The "single node" high level description that results from this reduction identifies the pattern.

The two approaches are similar in one respect. Both make use of a number of different microscopic views of a character rather than a single macroscopic view. As a result, either of these methods can "fail to see the forest for the trees". The decision theoretic approach has been criticized in the past for its failure to consider "structural information". The syntactic approach on the other hand attempts to make use of structural information but is based on the assumption that it is easier to recognize the subpatterns of patterns than it is to recognize the patterns themselves. Anyone who has attempted to decipher human handwriting can see the fallacy in this reasoning. In many cases, a letter can only be identified because of its position in a word. In the same way it seems reasonable to believe that a subpattern, like a corner or a bend, can only be correctly identified by considering its position in a surrounding character.

Summary of the Invention

I have designed an automated character recognition mechanism which constructs a "name" or "spelling" for an input character and then, finds the closest character from a set of previously established characters by finding the character that has the closest "name" to that of the input character.

The constructed name is generated by first thinning the presented input character to a line drawing or "skeleton". Then the character is traversed from a point on its lower left hand side. The physical direction of the traversal at each point of the character establishes the "name", which is a series of "l"s, "r"s, "u"s, "d"s and "-"s. "L"s represents points in the path where the path turns left, "r" represents points where the path turns right, and "u"s and "d"s represent points where the path goes up and down respectively. "-"s retrace the path so that a (second or third) branch can be attached to an earlier point (fork) in the path. A typical word, for example an "A", might have the name.

"uur uur uur ur r ur ur uur ur uur ur uur ur r ur rr d
    rrd rd rrd rd rd rd d rd rd rdd rd rdd rd d rd .
  . . dldlllllllllllllllllll ul".

This standard name and others are stored in a directory of such names. The name generated from the actual input character will in all probability vary somewhat from the standard character name, and this variation can be thought of as a misspelling of the actual character name. The generated name is then compared to the standard directory to determine the closest possible match. Based on the match, the machine would then "know" the provided character.

BRIEF DESCRIPTION OF THE DRAWING

The solution to the foregoing problems, together with the operation and utilization of the present invention, will be more fully apparent from the following description taken in conjunction with the drawing, in which:

FIG. 3 shows the character "A" leaning to the right;

FIG. 4 shows a thinned version of the "A" of FIG. 3;

FIG. 5 shows the spelling of the leaning "A" of FIG. 4;

FIG. 6 shows how FIGS. 7 and 8 should be arranged;

FIGS. 7 and 8 show the standard spellings of the characters;

FIG. 11 shows how different sloped lines generate spellings which are very similar;

GENERAL DESCRIPTION

Figure 1:
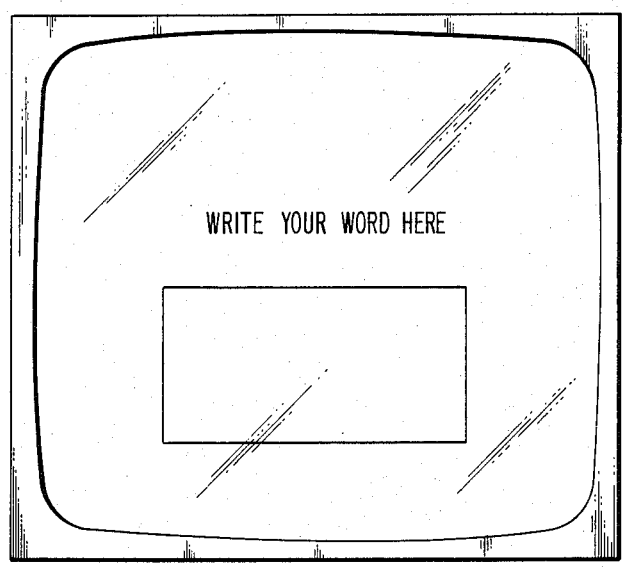
FIG. 1 shows a screen on which a word or letter can be written.
Figure 2:
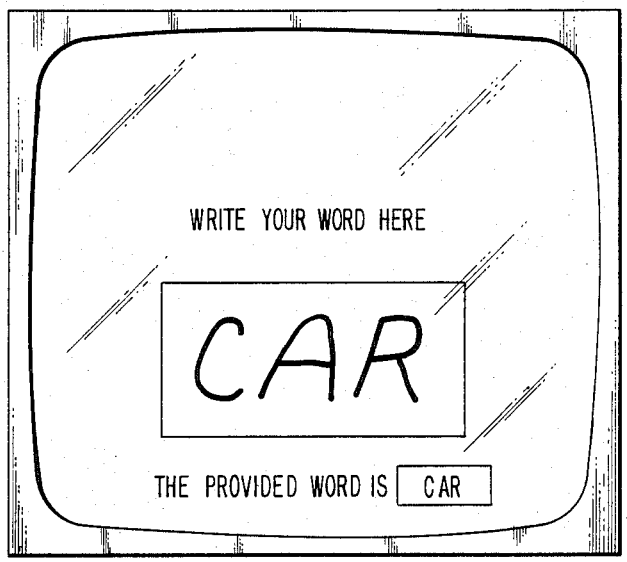
FIG. 2 shows the system decoding the provided word.

One character recognition system which demonstrates the application of my invention is shown in FIGS. 1 and 2. This system includes a "picture editor" and a character recognizer. A word can be drawn on a touch sensitive screen of the type shown in copending patent application of L. R. Kasday, Ser. No. 140,715, now L. R. Kasday, Continuation Ser. No. 333,744, Filed Dec. 23, 1981, assigned to the common assignee, which is hereby incorporated by reference. The editor allows users to draw and edit figures by tracing lines on the touchsensitive screen. A user can draw and erase using a finger for a "paint brush" and can move between draw and erase modes by touching particular areas of the screen. The terminal would be connected to a processor (not shown) such as a Digital Equipment Corporation VAX 11/780, which is hereby incorporated by reference, for controlling the system.

Figure 14:
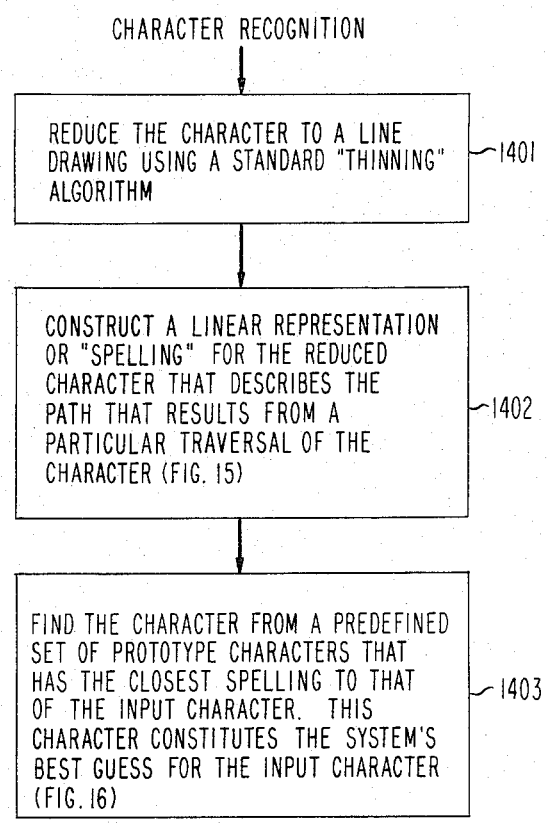
FIGS. 14, 15, and 16 show algorithms illustrating how the invention is practiced.

The character recognizer, or processor, "recognizes" characters by finding the "closest" character from a predefined set of character prototypes. As shown in FIG. 14, the recognizer finds the closest character by (1) reducing the input character to a line drawing, box 1401, (2) constructing a linear representation or "spelling" for the line drawing that describes the path that results from a particular traversal of the drawing, box 1402, and (3) finding the character in the dictionary of prototype characters having the closest spelling to that of the input character, box 1403.

The input character is reduced to a line drawing ("thinned") using a thinning algorithm, such as the one described by C. J. Hilditch, in "Linear Skeletons from Square Cupboards," which appeared in *Machine Intelligence*, Vol. 4, pages 403—420, printed by Edinburgh University Press in 1969, which is hereby incorporated by reference.

Figure 15:
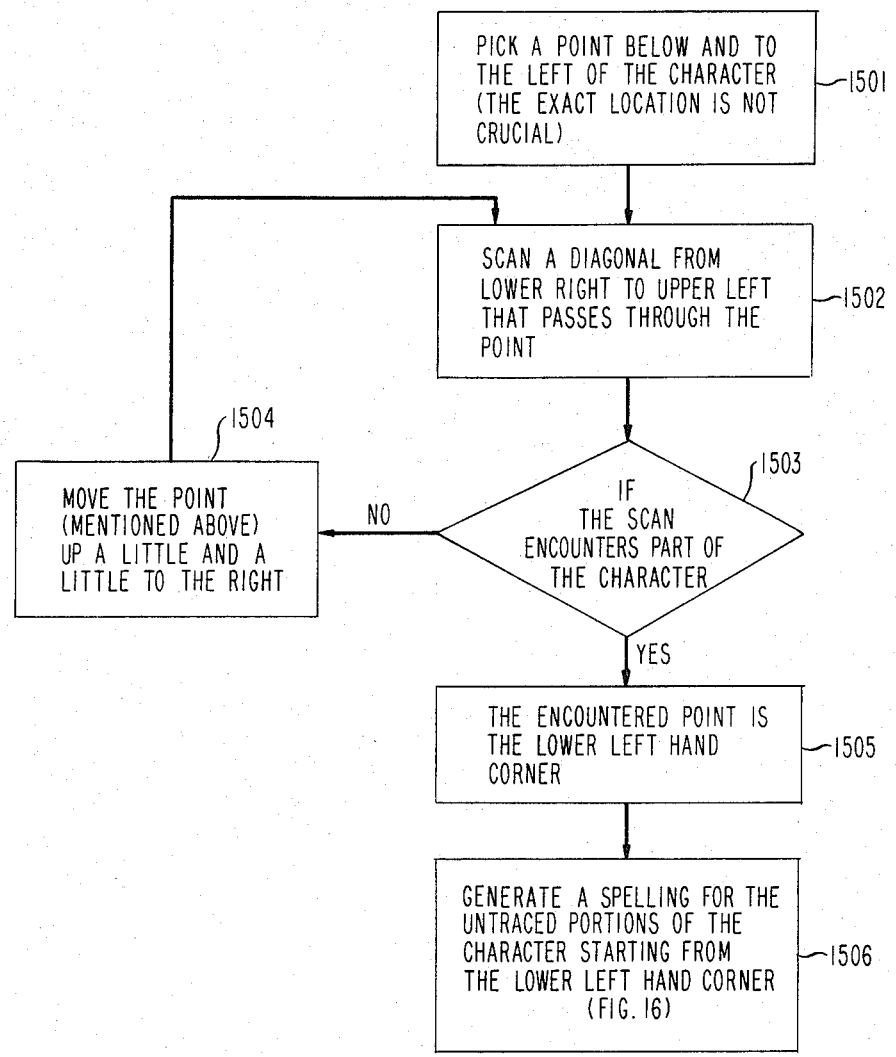

The linear representation or spelling for the reduced character is made, as shown in FIG. 15, by traversing the character (in a recursive procedure) in a particular way. The spelling is a sequence of "u"s, "d"s, "l"s, "r"s and "-"s that describes the path resulting from that traversal. The spelling contains a "u" when the path goes up, a "d" when it goes down and "l"s and "r"s when it goes left and right respectively. "-"s are used to retrace the path so that a (second or third) branch can be attached to an earlier point in the path.

Figure 8:
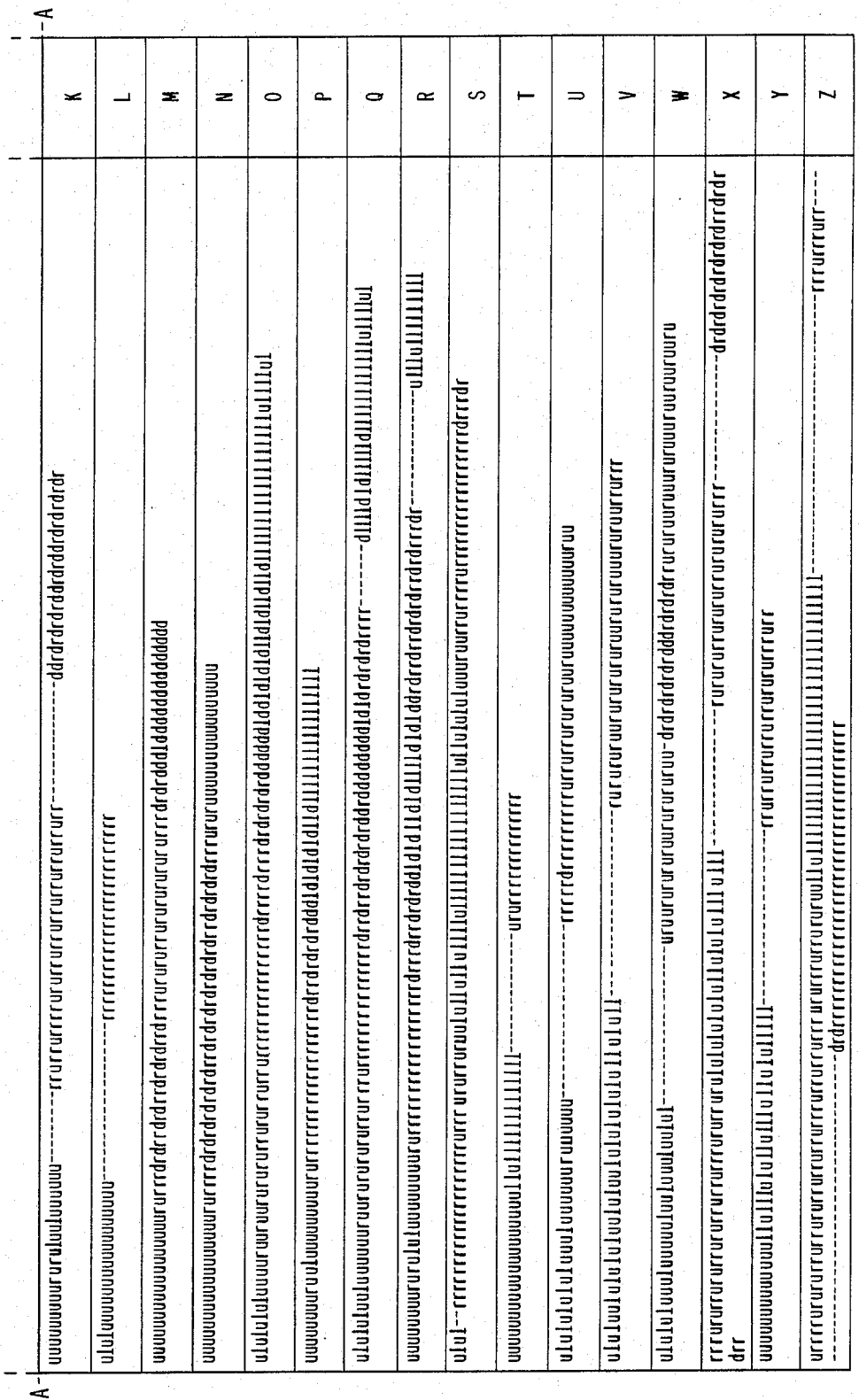

A sample input character, an "A", is shown in FIG. 3 leaning to the right with uneven legs. A thinned version of the character is shown in FIG. 4 and a linear representation for the (thinned) character "spelling" for this leaning "A" is shown in FIG. 5. The derived spelling will be presented to the dictionary of standard spellings (FIGS. 7 and 8) to determine the closest spelling which is defined as the one requiring the smallest number of changes to be transformed into the input spelling. The number of changes required to transform one string into another is the subject of my copending patent application filed concurrently herewith now U.S. Pat. No. 4,453,217, dated June 5, 1984, which is hereby incorporated by reference.

In FIG. 4 there is shown, for each traversal between nodes, a directional statement. These statements are numbered beginning with 1 in the lower left corner. Statement Number 1 describes an "ur" (up right) direction, and so forth, around the "A". As shown, statements 38 through 45 are "-"s, which indicate that the prior traversed nodes (i.e., nodes 30 through 37) are to be retraversed in the reverse direction to arrive back at the fork. Then the traverse goes left (positions 46–54) for 8 nodes ending with an "ul" statement.

DETAILED DESCRIPTION

If characters are to be recognized on the basis of similarities between their derived spellings and the spellings of prototype characters, the spellings must be generated in a consistent way. A spelling that starts from one part of a character may be quite different from a spelling starting at another point and if the spelling of an input character were to start at the wrong place the character might be classified incorrectly. This problem can be avoided by using a consistent point of origin. Thus, by way of convention, I have decided to start the spelling of any character from the character's lower lefthand corner.

Small changes in a character should not cause large changes in its point of origin. If the left leg of an "A" is too short or if the top of an "R" extends too far to the left, the algorithm must still be able to correctly identify the character's lower left hand corner.

Figure 9:
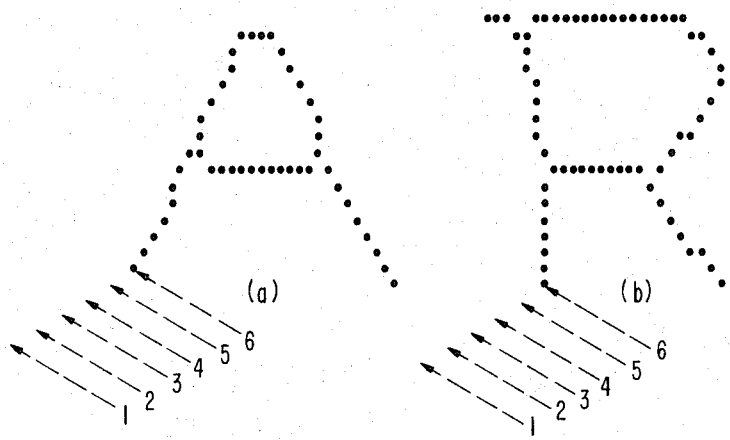
FIG. 9 shows how the starting point for a traversal is derived.

The algorithm finds a lower left hand corner by searching a set of diagonals shown in FIG. 9 that run from lower right to upper left (numbered 1–6) from a point below and to the left of the character. Diagonals are searched one after another in the direction of the character (from lowest to highest) until the first element or node of the character is found. This point is defined to be the lower left hand corner since this point does not change very much with minor variations in the character. This procedure is shown in FIG. 15, boxes 1501–1505.

Figure 10:
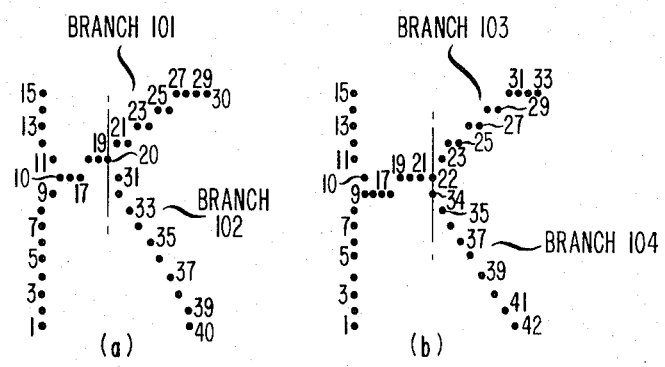
FIG. 10 shows how the order of traversal of the branches is determined.

Just as small changes in a character should not cause large channels in its point of origin, small variations should not cause large changes in the path through the character. A small change should not cause the spelling to take the wrong branch first when the path comes to a fork, a fork being a node having more than two neighbors. For example, in FIG. 10a, node 10 would be a fork. One convention for handling forks might be to start a clockwise search from a priorly determined standard direction (say, down) at that node. However, such a convention can cause letters with minor differences to have grossly different traversal paths and therefore grossly different spellings. This can be seen in FIG. 10a where a clockwise search starting in the "down" direction, from node 20 would find node 21 in branch 101 before node 31 in branch 102. In FIG. 10b, where the "K" is presented in a slightly different orientation, this convention at node 22 would cause the path to visit branch 104 (nodes 34-42) before branch 103 (nodes 23-33) because branch 104 starts with node 34 which is in the down direction with respect to node 22. Thus, the same character (but for a minor variation) could have very different spellings.

This problem is overcome by starting the clockwise search for a new branch at a fork from the direction of the last visited neighbor of that fork. Thus, in FIG. 10b, at fork 22, the search for a new branch begins in the direction of a line from node 22 to node 21, which in the example is horizontal, right to left, and proceeds clockwise until node 23 in branch 103 is found. Thus, the same basic path will be followed in both presentations of the "K" in spite of the minor differences between the two characters.

The problem of visiting the correct branch first must also be solved for the lower left hand corner. In letters like "B", "C", and "D", the "correct branch" is not obvious. In this case, the algorithm looks for an unvisited neighbor of the current node by searching in a clockwise direction starting from the down and left direction. Since the current node is the lower left hand corner, by definition there cannot be any portions of the character downward and to the left. Thus, there are no variations in this direction that can be affected by the discontinuity in the clockwise search. Thus, this choice insures that the traversal starts in a standard way.

Figure 16:
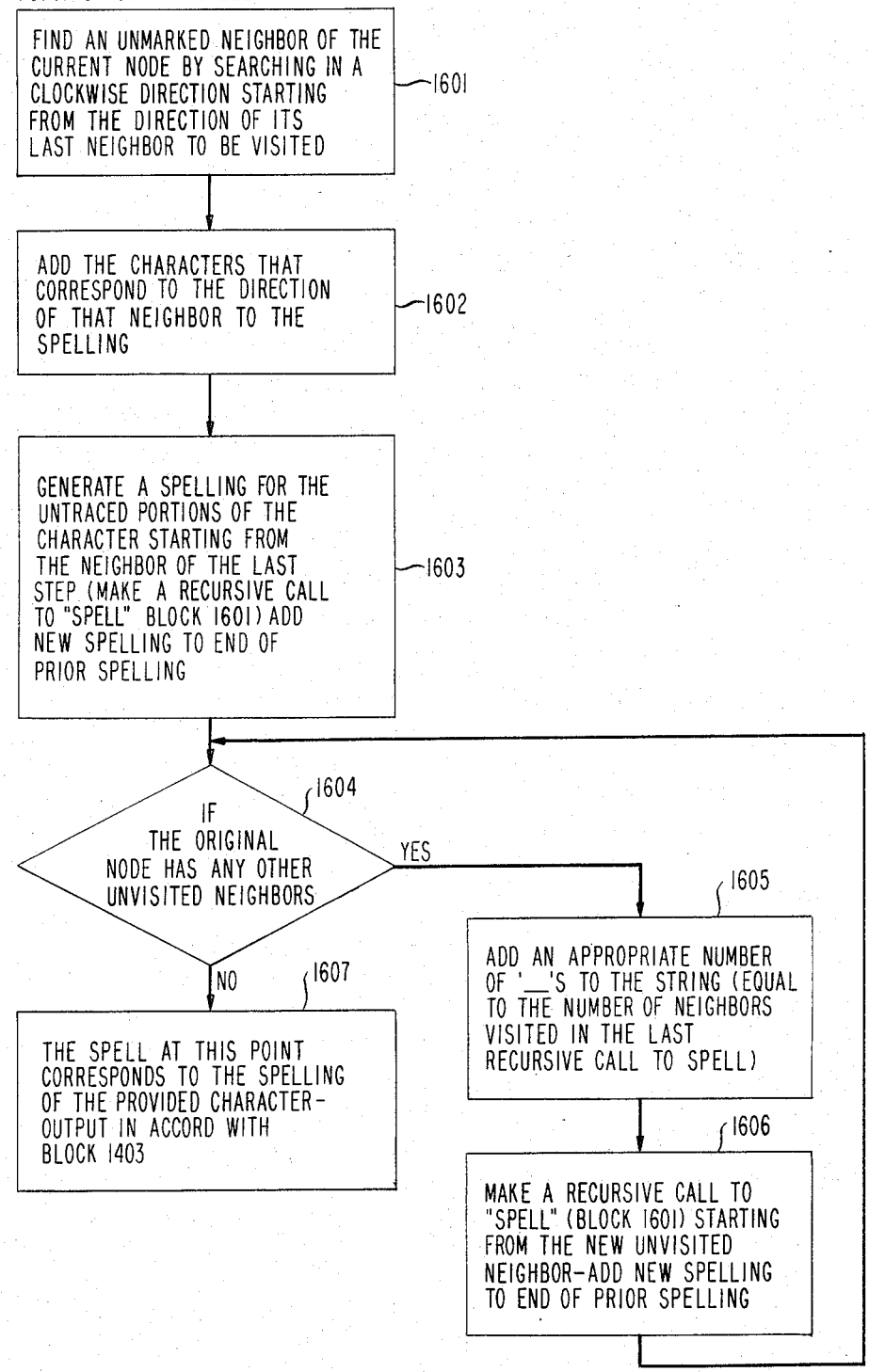

As the path is traversed, a spelling is obtained as is shown in FIG. 5 for the "A" of FIG. 4. This procedure is shown in FIG. 16, boxes 1601–1607. This spelled word is then provided to the dictionary lookup table of FIGS. 7 and 8, and the closest match, as set out in my aforementioned copending patent application, is obtained. The character (letter or number) associated with the closest match is returned or indicated on the screen as desired.

Capabilities

Figure 11:
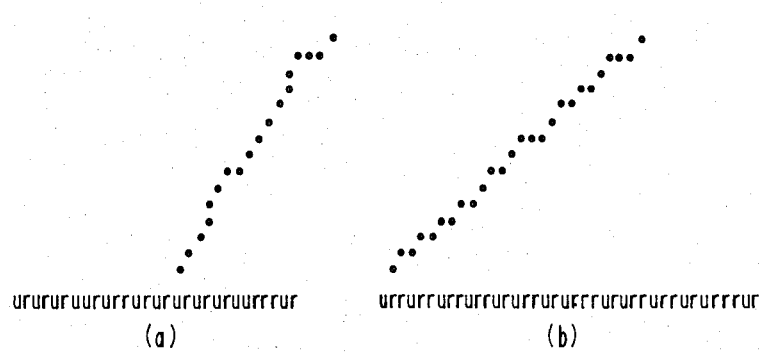
Figure 12:
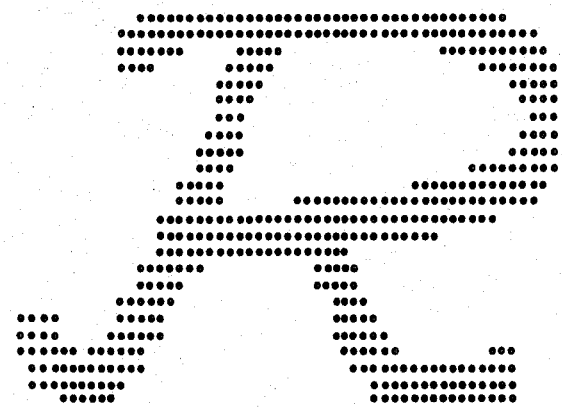
FIGS. 12 and 13 show different character fonts or styles which result in spellings similar to the standard ones.
Figure 13:
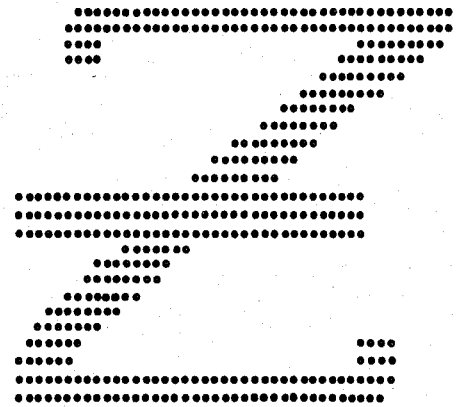

The character recognizer that has been described handles a variety of problems with the same basic mechanism. It can deal with positional variations since a character's spelling is independent of its position. Slope variations are not a problem since lines of similar slope have similar spellings. In this respect the two slopes of FIGS. 11 (a) and (b) have only minor spelling differences as shown. The arrangement can handle minor rotational variations since it deals with slope variations, and it can handle variations in the "sharpness" of corners for the same reason. The program deals with curves that should be corners and corners that should be curves and it is not confused by serifs or "glitches" when they are present. FIGS. 12 and 13 show characters that were correctly identified even though the standard spellings were derived from ordinary, unslanted (un-serified) Roman characters.

The order in which the algorithm traverses a character's branches tends to minimize the effects that serifs have on spellings. Since traversals start at the lower left hand corner and since the clockwise branch search starts from the node that was visited just before the "current node", paths tend to visit a character's "extremities" before its internal portions. Thus, when an extremity is added to a character, the spelling changes by a sequence that describes the tracing and retracing of that extremity. If traversals visited the internal portions first, the addition of an extremity would change the spelling by a sequence describing the extremity plus a sequence describing the retracing of some of the character's internal portions thereby making the error greater.

The algorithm is sensitive to variations that cause major changes in a character's traversal path. If a character is not connected where it should be, or if it is connected where it should not be, the traversal may be radically changed and the character may be classified incorrectly. The current system handles minor gaps by "smearing" characters slightly before processing them.

The system can be made more tolerant of gaps in characters if gaps are spanned by "dotted lines". The standard path through a character would follow dotted lines just as it follows ordinary lines but dotted lines would be represented differently in the spelling. For example, dotted lines might be represented by upper case letters, and these letters could, if one wished, be treated specially for lookup purposes. The use of dotted lines would minimize the effect of gaps on a standard path while at the same time allowing the program to differentiate lines from "white space".

The system can also be made more tolerant of variations in the size of characters. The input character can be expanded or reduced to the size of the prototypes characters, in effect, if it is overlaid with a square grid in which the number of squares from the top of the character to the bottom is the same as it is in the prototypes. Spellings based on this grid will then be to the same scale as spellings derived from characters of the proper size.

It would, of course, be obvious that the actual spelling could involve consecutive numbers, letters or other characters, which could be mapped directly into an array to facilitate the process of finding the closest match.

What is claimed is:

1. The machine method of character recognition comprising the steps of thinning, under control of said machine, a character to be recognized to produce a line drawing or skeleton and storing said thinned character in said machine, traversing, under control of said machine, said thinned character using a set of traversing rules and controlling said machine to derive, during said traversing, a name, the individual letters of which represent the various physical directions traversed, machine comparing said derived name to a dictionary of names stored in said machine to determine the stored name that most closely resembles the derived name thereby determining the identity of the character that has been traversed, said dictionary containing a single stored name for each possible character, said comparing step includes the steps of subdividing said dictionary of stored names into at least one subdictionary of letter strings each of said letter strings having as a first letter the same letter as the first letter of said derived name, and examining said subdictionary for matches between particular letters of said derived name and particular letters of one of said subdictionary letter strings.

2. The invention set forth in claim 1 wherein said traversing rules comprise the machine steps of determining a node at the lower left corner of said character, determining at said node a next adjacent branch of said character, and traversing said character along said branch of said character starting from said node and moving along said branch.

3. The invention set forth in claim 2 wherein said next branch determining step includes the steps of establishing a direction pointing downward and to the left of said determined node, and starting from said direction finding the next untraversed node in a clockwise direction.

4. The invention set forth in claim 1 wherein said traversing rules comprise the steps of determining a node having a fork thereat determining at said node a next adjacent branch of said character, and traversing said character along said branch of said character starting from said node and moving along said branch.

5. The invention set forth in claim 4 wherein said next branch determining step includes the steps of establishing a direction pointing toward a last traversed node, and starting from said direction finding a next untraversed node in a clockwise direction.

6. A pattern recognition arrangement comprising the steps of deriving, from a traversal of a pattern, a unique name of said pattern, said name having individual letters representing the various directions traversed, selecting from a data base of pattern names the name that most closely approximates said derived name, said data base containing a single name for each possible character, said comparing step includes the steps of subdividing said sub-data base of stored names into at least one data base of letter strings each of said letter strings having as a first letter the same letter as the first letter of said derived name, and examining said sub-data base for matches between particular letters of said derived name and particular letters of one of said sub-data base letter strings.

7. The machine method of character recognition comprising the steps of thinning, under control of said machine, a character to be recognized to produce a line drawing or skeleton and storing said thinned character in said machine, traversing, under control of said machine, said thinned character using a set of traversing rules and controlling said machine to derive, during said traversing, a name, the individual letters of which represent the various physical directions traversed, machine comparing said derived name to a dictionary of names stored in said machine to determine the stored name that most closely resembles the derived name thereby determining the identity of the character that has been traversed, determining the first letter of said derived name, selecting from a dictionary having a single preestablished name for each character to be recognized those dictionary names having the same first letter as said determined first letter of said derived name, recursively comparing each subsequent letter of said derived name with each subsequent letter to select the dictionary name having the fewest number of mismatches between like positioned letters, and displaying the character associated with said selected name.

* * * * *